United States Patent [19]

Sherif et al.

[11] Patent Number: 5,573,991
[45] Date of Patent: Nov. 12, 1996

[54] PREPARATION OF METAL CARBIDE CATALYST SUPPORTED ON CARBON

[75] Inventors: Fawzy G. Sherif, Stony Point; Anantha N. Desikan, Cortland Manor, both of N.Y.

[73] Assignee: Akzo Nobel N.V., Arnhem, Netherlands

[21] Appl. No.: 246,533

[22] Filed: May 20, 1994

Related U.S. Application Data

[63] Continuation-in-part of Ser. No. 201,475, Feb. 24, 1994, Pat. No. 5,451,557.

[51] Int. Cl.⁶ ................................................ C07C 27/22
[52] U.S. Cl. ........................ 502/177; 423/439; 423/440; 423/441
[58] Field of Search ........................ 502/177; 423/439, 423/440, 441, 442, 437 R, 352

[56] References Cited

U.S. PATENT DOCUMENTS

| | | | |
|---|---|---|---|
| 4,271,041 | 6/1981 | Boudart et al. | 502/177 |
| 4,325,843 | 4/1982 | Slaugh et al. | 502/177 |
| 4,522,708 | 4/1982 | Leclercq et al. | 208/136 |
| 4,851,206 | 7/1989 | Boudart et al. | 423/440 |
| 5,071,813 | 12/1991 | Kugler et al. | 502/177 |
| 5,321,161 | 6/1994 | Vreugdenhil et al. | 564/490 |
| 5,338,716 | 8/1994 | Triplett et al. | 502/177 |
| 5,451,557 | 6/1981 | Sherif | 502/177 |

OTHER PUBLICATIONS

Journal of Catalysis 78, 116–125 (1982).

Primary Examiner—Asok Pal
Attorney, Agent, or Firm—Richard P. Fennelly; Louis A. Morris

[57] ABSTRACT

A process for forming a supported metal carbide catalyst, for example, a Group VIB transition metal carbide, such as tungsten carbide, which process comprises the calcination of a carbon support that has been impregnated with a metal carbide precursor comprising a water soluble salt of: (1) a cation comprising nitrogen-hydrogen bonded moieties, such as a guanidine cation; and (2) an anion, such as a tungstate anion, comprising metal-oxygen bonded moieties, so that upon calcination the product formed is the metal carbide and the by-products comprise ammonia and carbon dioxide.

8 Claims, No Drawings

PREPARATION OF METAL CARBIDE CATALYST SUPPORTED ON CARBON

RELATED APPLICATION

This is a continuation-in-part of U.S. Ser. No. 201,475, filed Feb. 24, 1994 U.S. Pat. No. 5,451,557.

BACKGROUND OF THE INVENTION

A variety of disclosures exist in the art in regard to how to form a supported metal carbide catalyst, including the following:

The impregnation of a support with a water soluble source of the metal alone, followed by calcination to the metal oxide, with subsequent exposure of the oxide to carburizing gases, such as methane/hydrogen (See S. T. Oyama et al., Ind. Eng. Chem. Res., 27, 1639 (1988)) or carbon monoxide (See P. N. Ross, Jr. et al., J. of Catalysis., 48, 42 (1977)) are two ways in which such supported catalysts might be formed. Both carburization reactions necessitate the use of high temperatures on the order of about 900° C. L. Leclercq et al., in U.S. Pat. No. 4,522,708, discusses several supported carbide systems, including work by Mitchell and co-workers in supporting molybdenum on active carbon and other work relating to Group VI metals on alumina (e.g., U.S. Pat. Nos. 4,325,843 and 4,326,992). U.S. Pat. No. 4,325,842 to L. H. Slaugh et al. describes the preparation of supported molybdenum carbide compositions which are formed on a variety of supports, including charcoal and graphite, by impregnating the support with a solution of hexamolybdenum dodecachloride, followed by drying, and then carburization in a carbiding atmosphere at elevated temperature.

Pending U.S. Ser. No. 156,670, filed Nov. 23, 1993 teaches that catalytic metal carbide compositions can be formed by the calcination of a guanidine compound, derivative or adduct with a transition metal salt containing the desired metal component of the carbide.

An improvement of the technology described in this pending application is described in U.S. Pat. No. 5,451,557 in which a water soluble precursor is calcined to form the desired metal carbide catalyst on a support which is an oxidic support, preferably coated with a protective ceramic passivation layer as described and claimed in U.S. Pat. No. 5,338,716.

DESCRIPTION OF THE INVENTION

This invention relates to a novel process for forming a supported metal carbide catalyst involving the calcination of a carbon support material which has been impregnated with a water soluble precursor for the metal carbide. The precursor is made by a one-step chemical reaction between a transition metal-containing compound and a carbon containing compound which is low in carbon content as described and claimed in U.S. Pat. No. 5,451,557 which is mentioned hereinbefore. In the broadest embodiment of the invention, the precursor used in the process is a water soluble salt of: (1) a cation comprising nitrogen-hydrogen bonded moieties with a high nitrogen to carbon content; and (2) an anion comprising metal-oxygen bonded moieties, so that upon calcination the product formed is the metal carbide and the by-products comprise ammonia and carbon dioxide. The precursor contains both a metal source, such as the Group VIB transition metal, tungsten, and a carbon source, such as a guanidine compound. Guanidine carbonate, which is of the formula $(CN_3H_5)_2H_2CO_3$, contains only 20% carbon and is an example. The precursor in very soluble in water. Its high solubility allows for the preparation of carbon supported catalysts in accordance with the present invention by impregnation. It allows the use of less volume of a solvent, not exceeding the pore volume of the carbon support that will be impregnated with the solution. This process, which is known as the "incipient wetness method", is preferred for the manufacture of such supported catalysts. The incipient wetness method requires that the volume of the solution be equivalent to the pore volume of the carbon support. Upon calcination of the impregnated carbon support, equal dispersion of the active component on the support will result. High solubility of the precursor will also allow increasing the metal loading on the carbon support at will.

In order to synthesize a high surface area, high porosity tungsten carbide catalyst, supported on a carbon support, it is preferred to have a precursor of the metal carbide in a form, soluble in water. The precursor is preferably a single compound and not a mixture of two components. It does not produce excess carbon upon calcination that would block the catalytic pore properties of the carbon support material itself. The composition of the precursor is made from one metal to one to five carbon atoms, preferable three carbon atoms. The carbon atoms are directly bonded to nitrogen atoms. The nitrogen atoms may be connected to hydrogen or other atoms. The carbon-nitrogen entity forms a cation attached chemically to the metal in the form of an anion with the cation having a high nitrogen to carbon content, preferably at a nitrogen to carbon atomic ratio of 3.0 to 1 or higher. The reaction can be described by the following generalized (unbalanced) equation:

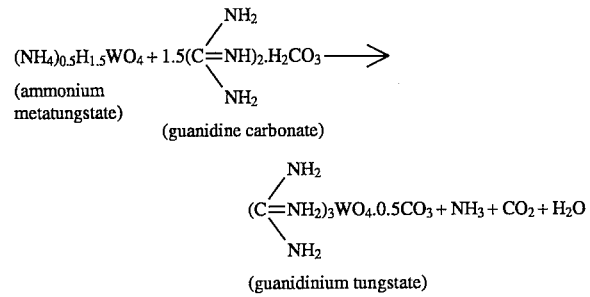

Calcination of this type of precursor, for example, guanidinium tungstate, at temperatures of from about 500° C. to about 800° C. gives tungsten carbide ($W_2C$) in substantially pure form. If exposed to air, this material may form a monolayer of $W_2CO$. During the calcination, the precursor components will interact, whereby the organic source will reduce the metal ion source within the same molecule and form a metal-carbon bond as a metal carbide, which would be substantially free of undesirable free carbon as represented by the following generalized (unbalanced) equation:

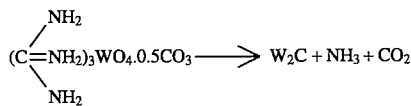

This calcination step does not involves carburization. It is a chemical reduction of the metal ion with the carbon-nitrogen ion of the same compound or from the ammonia released thereafter. It is believed that ammonia will reduce the tungstate ion into a lower oxidation state, which will in situ chemically react with the carbon in the same molecule forming carbides. The result is a metal carbide containing substantially no excess carbon, which is well dispersed over the carbon support, giving a high surface area catalyst. The ratio of the guanidine to the metal was found to be important for forming a metal carbide suitable for use as a catalyst for reactions such as isomerization of n-heptane. For example, it will be shown later that if the ratio of guanidine to the metal is less than three, other phases such as nitridic or metallic phases will be the main component. These phases will result in the undesirable cracking of heptane to lower hydrocarbons. When the ratio is 3:1, the only phase would be $W_2C$. The solution of guanidinium tungstate would also be easily impregnated into the porous support in one step, then calcined at an industrially reasonable temperature not exceeding 800° C.

The type of precursor which is to be used in accordance with the present invention in its broadest embodiment comprises a guanidinium cation and a transition metal-containing anion with the guanidinium to transition metal ratio being at least about 3:1, preferably about 3:1. The transition metal can be a Group VIB transition metal, such as tungsten, and the preferred anion is a tungstate. A molybdate anion can also be selected.

A composition of matter which is formed by the solid state reaction of ammonium metatungstate and guanidine carbonate at 100°–200° C., was found to be: (1) completely soluble in water; (2) decomposable at 228 ° C., which is different from decomposition temperature of the reactants; (3) contains 35–50% tungsten; (4) contains 5–10% carbon; (5) contains 20–30% nitrogen; (6) has a characteristic X-Ray diffraction pattern not found before; (7) forms mainly tungsten carbide, $W_2C$, containing substantially no free carbon, when heated at 600°–850° C. under nitrogen, such carbide showing catalytic activity in chemical hydrotreating reactions known to occur with noble metals, such as platinum and palladium; and (8) aqueous solutions of composition are dry impregnable by the incipient wetness method into a carbon solid support, in accordance with the present invention, prior to calcination, making it possible to produce such supported metal carbide catalysts.

The support material that is to be used with the present invention includes those carbon supports that are known to persons of ordinary skill in the art in supporting transition metal carbide catalysts, for example, that have been synthesized by differing methods heretofore.

The following Examples further illustrate the present invention.

EXAMPLE 1

Tungsten carbide supported on activated carbon (Norit® A activated carbon) was prepared by impregnating the activated carbon with an aqueous carbide precursor containing ammonium metatungstate (Sylvania brand 99.9%) and guanidine carbonate (Aldrich brand 99%). The impregnated samples were then dried at 150° C. for one hour and then calcined in an inert atmosphere of $N_2$ at 600° and 650° C. The samples were characterized by surface area measurements, x-ray diffraction (XRD), thermogravimetric analysis (TGA) and selective chemisorption. XRD indicated the presence of a mixture of amorphous material and very low crystallinity phases. The active species was identified as an oxygen-substituted $W_2C$. The catalysts had surface areas of about 550 $m^2g^{-1}$.

EXAMPLE 2

This Example demonstrates the reforming activity of the catalysts described in Example 1. The reforming of n-heptane was performed at 350°14 500° C. and atmospheric pressure. Hydrogen (10 $cm^3min^{-1}$) was bubbled through a reservoir containing n-heptane at 30° C. which then flowed through the sample bed (0.5 g). Reactant and product feed streams were analyzed by gas chromatography. Prior to catalytic testing, the catalysts were reduced in $H_2$ at 500° C. for two hours. The conversions and various selectivities that were obtained are summarized in the Table below:

| Temp. (°C.) | Time (min) | Conversion (%) | $C_1$–$C_4$ | Select. (%) Isomers | Aromatics |
|---|---|---|---|---|---|
| 350 | 30 | 2 | 67 | 33 | — |
| 400 | 55 | 14 | 56 | 41 | 3 |
| 400 | 75 | 13 | 55 | 41 | 4 |
| 450 | 115 | 49 | 38 | 22 | 40 |
| 450 | 155 | 44 | 37 | 24 | 39 |
| 500 | 60 | 94 | 27 | — | 73 |
| 500 | 80 | 94 | 26 | — | 74 |
| 500 | 100 | 92 | 25 | — | 75 |
| 500 | 150 | 90 | 24 | 1 | 75 |
| 500 | 180 | 89 | 24 | 1 | 66 |

The data show that at the high temperature of 500° C., about 90% of n-heptane was converted. The product distribution at this high conversion was about 75% of the desired aromatic products, mainly toluene, xylenes and benzene, and about 25% of low hydrocarbons, namely, methane, ethane, propane, and butane.

EXAMPLE 3

This Example demonstrates the hydrogenation activity of the catalysts. In this Example, 1-hexene hydrogenation to n-hexane was performed at 135° C. and atmospheric pressure. Hydrogen (10 $cm^3\ min^{-1}$) was bubbled through a reservoir containing 1-hexene at 30° C. Prior to catalytic testing, the catalysts were reduced in $H_2$ at 500° C. for two hours. The results are summarized in the Table below:

| Temperature (°C.) | Time (min) | Conversion (%) | Selectivity (%) n-hexane |
|---|---|---|---|
| 135 | 17 | 100 | 100 |
| 135 | 50 | 100 | 100 |

The high conversion of 100% and high selectivity of 100% is typical of that known for noble metal catalysts. Therefore, the instant catalyst could be an attractive and less expensive alternative to such noble metal catalysts.

EXAMPLE 4

This Example is similar to Example 1, except that the carbon support was acid washed activated carbon (Darco®). XRD indicated the presence of a mixture of amorphous material and very low crystallinity phases. The active species was identified as an oxygen-substituted $W_2C$. The catalyst had a surface area of about 924 $m^2g^{-1}$.

EXAMPLE 5

This Example demonstrates the n-heptane reforming activity of the catalyst described in Example 4. Experimental conditions are similar to that in Example 2. The conversions and selectivity's are summarized in the Table below:

| Temperature (°C.) | Time (min) | Conversion (%) | $C_1$–$C_4$ | Selectivity (%) Isomers | Aromatics |
| --- | --- | --- | --- | --- | --- |
| 350 | 30 | 1 | — | 80 | 20 |
| 350 | 50 | 1 | — | 80 | 20 |
| 400 | 90 | 4 | 21 | 74 | 5 |
| 400 | 110 | 4 | 22 | 74 | 4 |
| 400 | 200 | 3 | 21 | 76 | 5 |
| 400 | 260 | 3 | 22 | 74 | 4 |
| 500 | 20 | 72 | 23 | 8 | 69 |
| 500 | 50 | 59 | 26 | 10 | 64 |
| 500 | 80 | 60 | 25 | 9 | 66 |
| 500 | 115 | 54 | 25 | 10 | 65 |

The data shows that at high conversions of n-heptane (60%), the product distribution was about 65% of the desired aromatic products, mainly toluene (79%), benzene (19%) and xylenes (3%), and about 25% of low hydrocarbons (methane, ethane, propane and butane).

EXAMPLE 6

This Example demonstrates the 1-hexene hydrogenation of the catalyst described in Example 4. Experimental conditions for the reactivity testing are identical to those described in Example 3. The conversions and selectivities are summarized in the Table below.

| Temperature (°C.) | Time (min) | Conversion (%) | Selectivity (%) n-hexane |
| --- | --- | --- | --- |
| 150 | 30 | 90 | 66 |
| 150 | 60 | 90 | 67 |

The foregoing Examples are presented for illustrative purposes only. The scope of protection is set forth in the claims which follow.

We claim:

1. A process for forming a supported metal carbide catalyst which comprises the calcination of a carbon support that has been impregnated with a metal carbide precursor which comprises a water soluble salt of: (1) a cation comprising nitrogen-hydrogen bonded moieties; and (2) an anion comprising metal-oxygen bonded moieties, so that upon calcination the product formed is the metal carbide and the by-products comprise ammonia and carbon dioxide.

2. A process as claimed in claim 1 wherein the precursor comprises a Group VIB transition metal.

3. A process as claimed in claim 1 wherein the precursor comprises tungsten as the metal.

4. A process as claimed in claim 1 wherein the precursor comprises a tungstate anion.

5. A process for forming a metal carbide catalyst which comprises the calcination of a carbon support that has been impregnated with a metal carbide precursor which comprises a water soluble salt of: (1) a guanidine cation; and (2) an anion comprising the metal and oxygen, so that upon calcination the product formed is the metal carbide and the by products comprise ammonia and carbon dioxide.

6. A process as claimed in claim 5 wherein the precursor comprises a Group VIB transition metal.

7. A process as claimed in claim 5 wherein the precursor comprises tungsten as the metal.

8. A process as claimed in claim 5 wherein the precursor comprises a tungstate anion.

* * * * *